(12) United States Patent
Hatakeyama et al.

(10) Patent No.: US 10,618,491 B2
(45) Date of Patent: Apr. 14, 2020

(54) SIDE AIRBAG DEVICE

(71) Applicants: AUTOLIV DEVELOPMENT AB, Vargarda (SE); Naoki Hatakeyama, Yokohama (JP); Atsushi Murai, Yokohama (JP)

(72) Inventors: Naoki Hatakeyama, Yokohama (JP); Atsushi Murai, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 32 days.

(21) Appl. No.: 15/778,736

(22) PCT Filed: Nov. 25, 2016

(86) PCT No.: PCT/JP2016/084886
§ 371 (c)(1),
(2) Date: May 24, 2018

(87) PCT Pub. No.: WO2017/090700
PCT Pub. Date: Jun. 1, 2017

(65) Prior Publication Data
US 2019/0084515 A1 Mar. 21, 2019

(30) Foreign Application Priority Data
Nov. 26, 2015 (JP) .................................. 2015-230924

(51) Int. Cl.
*B60R 21/207* (2006.01)
*B60R 21/237* (2006.01)
*B60R 21/261* (2011.01)
(52) U.S. Cl.
CPC .......... *B60R 21/207* (2013.01); *B60R 21/237* (2013.01); *B60R 21/261* (2013.01); *B60R 2021/2612* (2013.01)

(58) Field of Classification Search
CPC ... B60R 21/207; B60R 21/237; B60R 21/261; B60R 2021/2612; B60R 2021/23146
(Continued)

(56) References Cited

U.S. PATENT DOCUMENTS 6,155,598 A * 12/2000 Kutchey ............... B60R 21/207
280/730.2
7,350,811 B2 * 4/2008 Sato .................. B60R 21/23138
280/730.1
(Continued)

FOREIGN PATENT DOCUMENTS

JP 2001-171468 A 6/2001
JP 2003-200811 A 7/2003
(Continued)

OTHER PUBLICATIONS

International Search Report of PCT/JP2016/084886, dated Feb. 21, 2017.

*Primary Examiner* — Ruth Ilan
*Assistant Examiner* — Hilary L Johns
(74) *Attorney, Agent, or Firm* — Dickinson Wright PLLC (57) ABSTRACT

A side airbag device including: a bag-shaped airbag that deploys from a lateral portion of a vehicle seat toward a front side of a vehicle; and an inflator that supplies inflation gas into the airbag. The airbag has, at least at a lower portion thereof, a lower tuck-in region tucked into the airbag. Further, at least a part of the lower tuck-in region is folded into a fan shape and forms a radial folded region folded into a pleated shape along a line extending rearward in a radial direction from a central point of the fan shape positioned on a front side of the airbag.

11 Claims, 10 Drawing Sheets

(58) Field of Classification Search
USPC .................................................... 280/730.2
See application file for complete search history.

(56) References Cited

U.S. PATENT DOCUMENTS

| | | | |
|---|---|---|---|
| 8,540,276 B2* | 9/2013 | Schneider | B60R 21/206 |
| | | | 280/730.1 |
| 8,727,375 B2 | 5/2014 | Suzuki | |
| 9,944,245 B2* | 4/2018 | Moeller | B60R 21/18 |
| 2004/0021304 A1* | 2/2004 | Tanase | B60R 21/207 |
| | | | 280/729 |
| 2005/0023808 A1* | 2/2005 | Sato | B60R 21/23138 |
| | | | 280/730.2 |
| 2012/0235388 A1* | 9/2012 | Suzuki | B60R 21/233 |
| | | | 280/730.2 |
| 2017/0072893 A1* | 3/2017 | Fujiwara | B60R 21/23138 |

FOREIGN PATENT DOCUMENTS

| | | |
|---|---|---|
| JP | 2006-321327 A | 11/2006 |
| JP | 2012-192871 A | 10/2012 |

\* cited by examiner

SIDE AIRBAG DEVICE

CROSS-REFERENCE TO RELATED APPLICATIONS

This application is a 35 U.S.C. § 371 national phase application of PCT International Application No. PCT/JP2016/084886, filed Nov. 25, 2016, which claims the benefit of priority under 35 U.S.C. § 119 to Japanese Patent Application No. 2015-230924, filed Nov. 26, 2015, the contents of which are incorporated herein by reference in their entirety.

FIELD OF THE INVENTION

The present invention relates to a side airbag device employing a novel method for folding a bag-shaped airbag.

BACKGROUND

It has been known to provide one or a plurality of airbags in vehicles to protect occupants in case of vehicle accidents. There have been various types such as a so-called driver airbag that inflates in the vicinity of the center of the steering wheel of an automobile to protect a driver, a curtain airbag that deploys downward inside the window of an automobile to protect an occupant in case of a shock in the lateral direction of the vehicle, a rollover, and a turnover accident, and a side airbag that deploys between an occupant and a side panel to protect the occupant in case of a shock in the lateral direction of a vehicle. The present invention relates to a side airbag device provided in a vehicle seat.

A side airbag device faces the problem of quickly and smoothly deploying an airbag since a space for deploying the airbag is narrow and limited. For example, it is demanded that an airbag quickly deploy and restrain an occupant between a vehicle seat and a door trim.

The present invention has been made in view of the above circumstances and has an object of providing a side airbag device capable of quickly and appropriately restraining an occupant at the initial stage of the deployment of an airbag.

The present invention is applied to a side airbag device including: a bag-shaped airbag that deploys from a lateral portion of a vehicle seat toward a front side of a vehicle; and an inflator that supplies inflation gas into the airbag. The airbag has, at least at a lower portion thereof, a lower tuck-in region tucked into the airbag. Further, at least a part of the lower tuck-in region is folded into a fan shape and forms a radial folded region folded into a pleated shape along a line extending rearward in a radial direction from a central point of the fan shape positioned on a front side of the airbag.

According to the present invention having the above configurations, at least the part of the lower tuck-in region forms the radial folded region folded into the pleated shape along the line extending rearward in the radial direction from the central point positioned on the front side of the airbag. Therefore, the rear portion of the radial folded region having a large folding width first deploys at the initial stage of the deployment of the airbag. Therefore, it becomes possible to quickly restrain the vicinity of the lateral portion of the lumbar of an occupant sitting on a vehicle seat.

In order to easily fold and largely expand the airbag, the central point of the folded region having the fan shape is preferably provided to be positioned on a marginal portion of the airbag on the front side of the vehicle when the airbag deploys. On the other hand, when the central point is virtually set outside the marginal portion of the airbag on the front side of the vehicle, the front portion of the airbag has a large folding width, which brings about an advantage that the front portion also deploys relatively quickly. Further, when the central point is set on the inside of the marginal portion of the airbag on the front side of the vehicle, the fold line can have a large inclination angle, which makes it possible to more quickly deploy the rear lower end of the airbag.

The side airbag device can be so configured that a plurality of parallel folded regions folded along at least two substantially parallel lines is provided above the radial folded region, and that the radial folded region is tucked between the parallel folded regions. At this time, at least a part of the radial folded region is preferably brought into a state of protruding from the lower tuck-in region in a state in which the parallel folded regions are tucked into the airbag. This is because the radial folded region is intended to deploy prior to the parallel folded regions in the present invention.

The fold lines of the parallel folded regions can be inclined such that front sides thereof are lowered with respect to a horizon. Thus, space capacity of the initially-deploying rearward lower portion (radial folded region) of the airbag can be increased.

The side airbag device in accordance with the present invention is preferably so configured that the inflator is accommodated on a rear side of the vehicle inside the airbag, and that an upper fold line of the parallel folded regions is positioned in a vicinity of a lower end of the inflator. Further, a baffle member that vertically distributes the gas discharged from the inflator is preferably arranged inside the airbag, and the lower tuck-in region is preferably arranged below the baffle member.

When the baffle member is inclined such that a front side thereof is lowered with respect to the horizon, the same effect as that produced when the parallel folded regions are inclined such that the front sides thereof are lowered can be expected.

DETAILED DESCRIPTION

A description will be given of a side airbag device according to an embodiment of the present invention based on the accompanying drawings. Note that in each figure, "front" represents the front side (traveling direction) of a vehicle, "rear" represents the rear side (side opposite to the traveling direction) of the vehicle, "inside" represents an inside (occupant side) in a vehicle width direction, "outside" represents an outside (door panel side) in the vehicle width direction, and "left" and "right" represent left and right sides with respect to the traveling direction of the vehicle, respectively.

Figure 1:
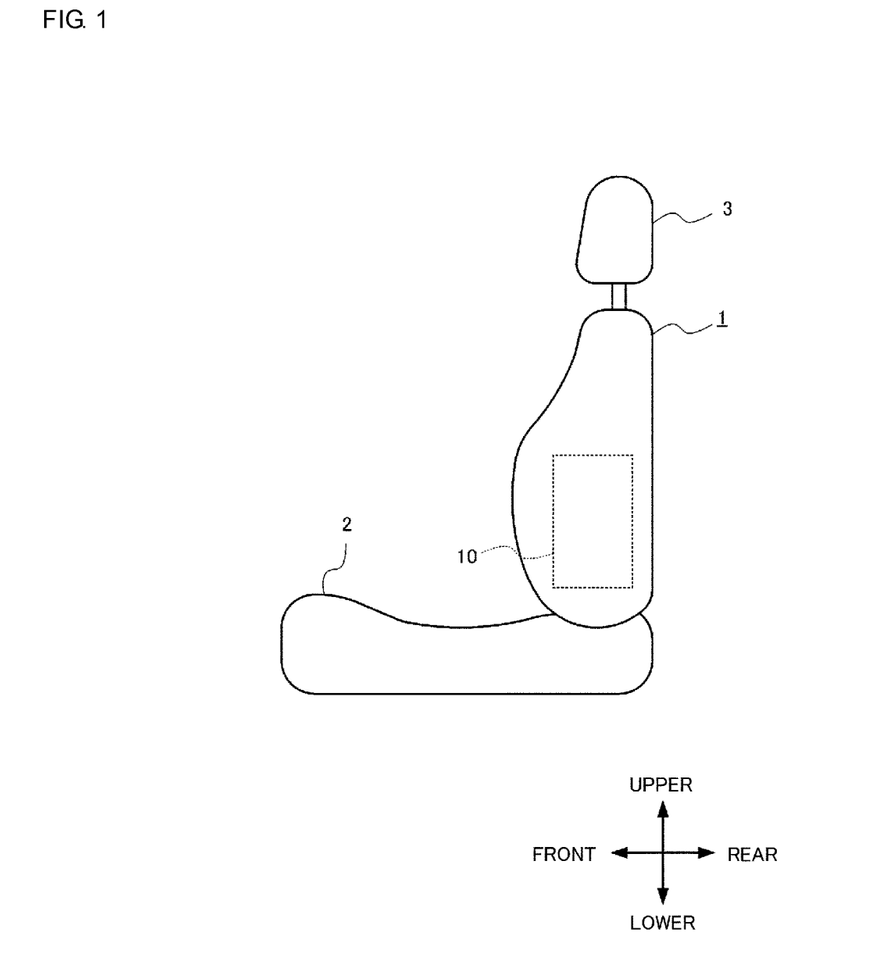
FIG. 1 is a side view showing the shape of the appearance of a vehicle seat in which a side airbag device according to an example of the present invention is installed.
Figure 2:
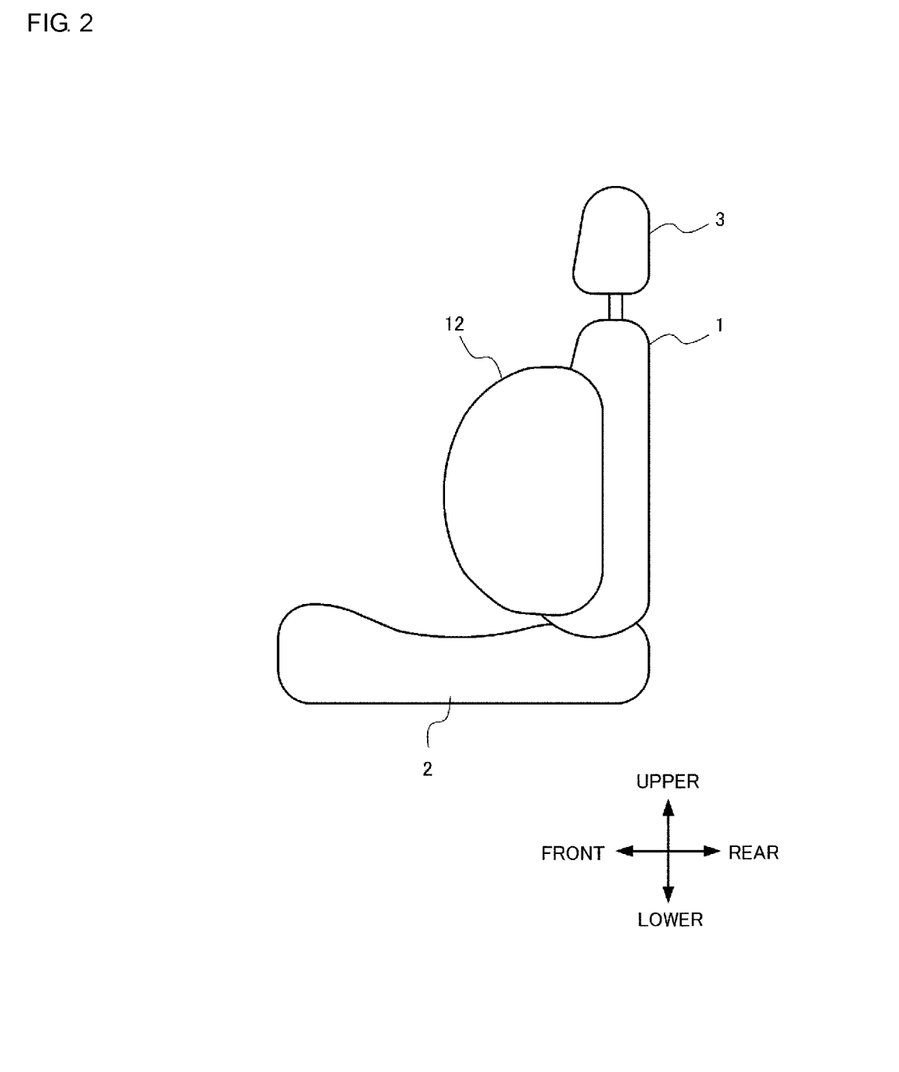
FIG. 2 is a side view showing the deploying state of an airbag when observed from an outside in a vehicle width direction in the side airbag device according to the example.

FIG. 1 shows the shape of the appearance of a vehicle seat in which a side airbag device 10 according to an example of the present invention is installed. FIG. 2 shows the deploying state of an airbag 12 when observed from the outside in the vehicle width direction in the side airbag device 10 according to the example.

As shown in FIG. 1, the side airbag device 10 according to the present invention is installed in the lateral portion of the vehicle seat composed of a seat cushion 2 representing a portion on which an occupant sits, a seat back 1 forming a backrest, and a headrest 3 connected to the upper end of the seat back 1. Further, as shown in FIG. 2, the airbag 12 is configured to inflate and deploy toward the front side of the vehicle when a collision occurs.

Figure 3:
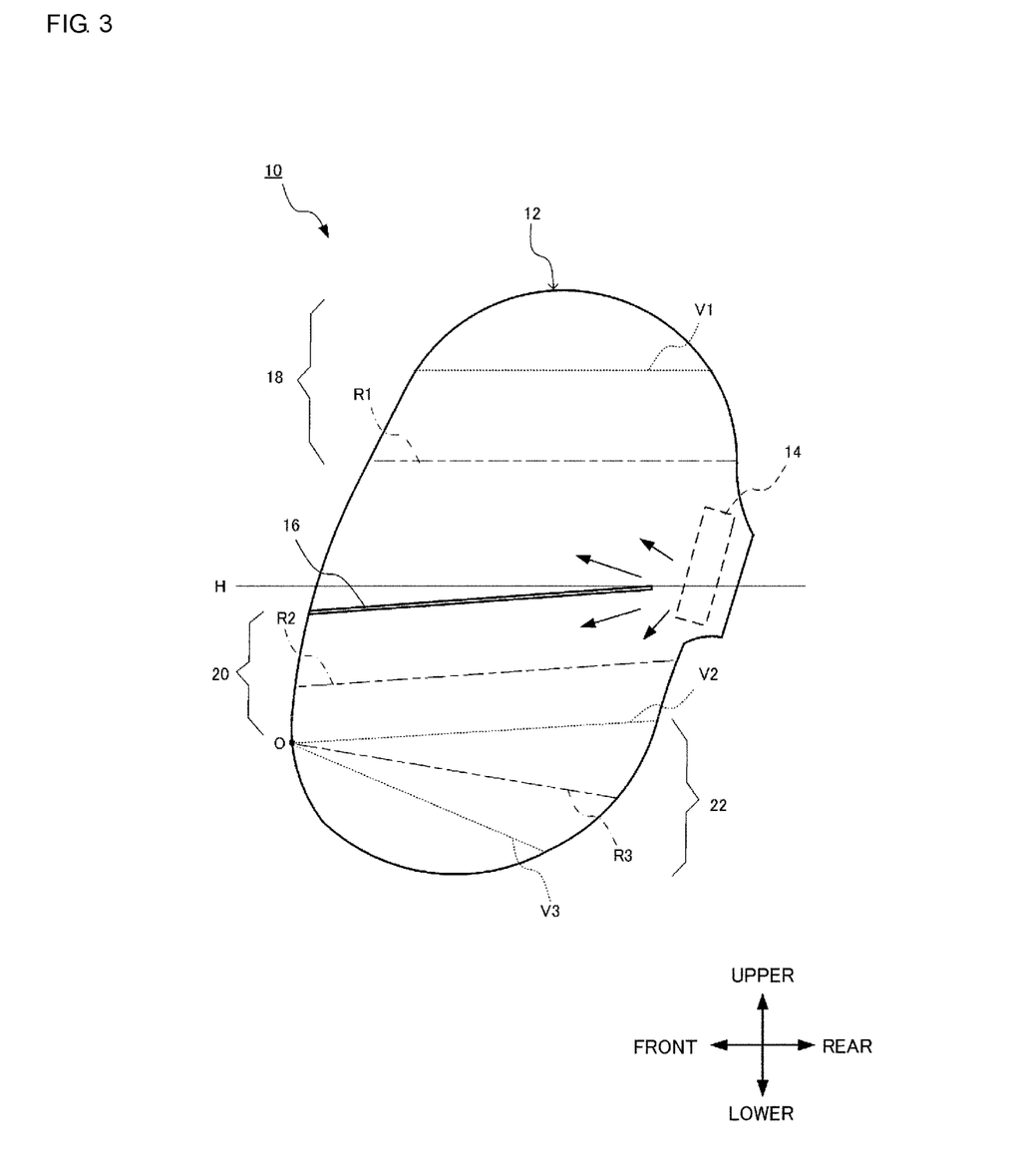
FIG. 3 is a side view (plan view) showing the deploying state (state before compression) of the side airbag device according to the example.

FIG. 3 is a side view (plan view) showing the deploying state (state before compression) of the side airbag device 10 according to the example. The side airbag device 10 includes a bag-shaped airbag 12 that deploys from the lateral portion of the vehicle seat to the front side and an inflator 14 that supplies inflation gas into the airbag 12.

The airbag 12 has, at its lower portion, lower tuck-in regions 20 and 22 tucked into the airbag 12. The lower tuck-in regions 20 and 22 are folded into a fan shape and have a radial folded region 22 folded into a pleated shape along lines R3 and V3 extending rearward in a radial direction from a central point O of the fan shape positioned on the front side of the airbag 12 and a parallel folded region 20 folded along at least two substantially parallel fold lines R2 and V2 above the radial folded region 22. Further, the radial folded region 22 is configured to be further tucked into the parallel folded region 20.

Here, the lower tuck-in regions 20 and 22 represent regions that are positioned below a horizon H along which the airbag 12 is vertically divided in the vicinity of its center when the airbag 12 in its expanding state before being folded or in a completely deploying state after inflating is observed from the vehicle width direction, and that are completely accommodated inside the airbag 12 when tucked into the inside (upper side) of the airbag 12 from their lower end direction.

The radial folded region 22 is a fan-shaped region that forms a part of the lower end side of the lower tuck-in regions (20 and 22), includes the plurality of fold lines V3 and R3 extending rearward from the prescribed point (central point) 0 positioned on the front marginal portion of the airbag 12, and is folded into a pleated shape along these fold lines, and can also be called a region folded into a fan shape. Note that each region folded into a pleated shape forms a fan shape in the example of FIG. 3 since a rear marginal portion has an arc shape, but forms a triangle shape when the rear marginal portion is a straight line shape.

Further, the parallel folded region 20 is a region that forms a part of the lower tuck-in regions (20 and 22) and is continuously connected to the upper side of the radial folded region 22, and is folded into a band shape along the two substantially parallel fold lines R2 and V2 extending in the front and rear directions of the airbag 12 to be accommodated inside the airbag 12.

The inflator 14 is accommodated on the rear side of the vehicle inside the airbag 12 and so configured that the upper fold line (mountain fold) R2 of the radial folded region 22 is positioned in the vicinity of the lower end of the inflator 14.

Inside the airbag 12, a baffle plate 16 that distributes gas, which is discharged from the inflator 14, to upper and lower spaces (chambers) is provided. Note that the lower tuck-in regions 20 and 22 are arranged below the baffle plate 16.

The baffle plate 16 is formed of, for example, the same fabric as the airbag 12 and can be fixed to the lateral surface of the airbag 12 by sewing. Although not shown in the figure, the baffle plate 16 can be configured to have a vent hole where necessary to allow the inflation gas to communicate between the upper and lower spaces.

The baffle plate 16 is obliquely provided such that the front side thereof is lowered with respect to the horizon H. Thus, capacity of the initially-deploying rearward lower portion (radial folded region 22) of the airbag can be increased. However, it is also possible to horizontally arrange the baffle plate 16 according to the shape or the like of the airbag.

The mountain fold line R2 and the valley fold line V2 of the parallel folded region 20 are formed to be parallel to the baffle plate 16.

The airbag 12 has, at its upper portion, an upper tuck-in region 18 tucked into the airbag 12. In the upper tuck-in region 18, the fabric of the region 18 is tucked into the airbag 12 along a mountain fold line R1 and a valley fold line V1.

Figure 4:
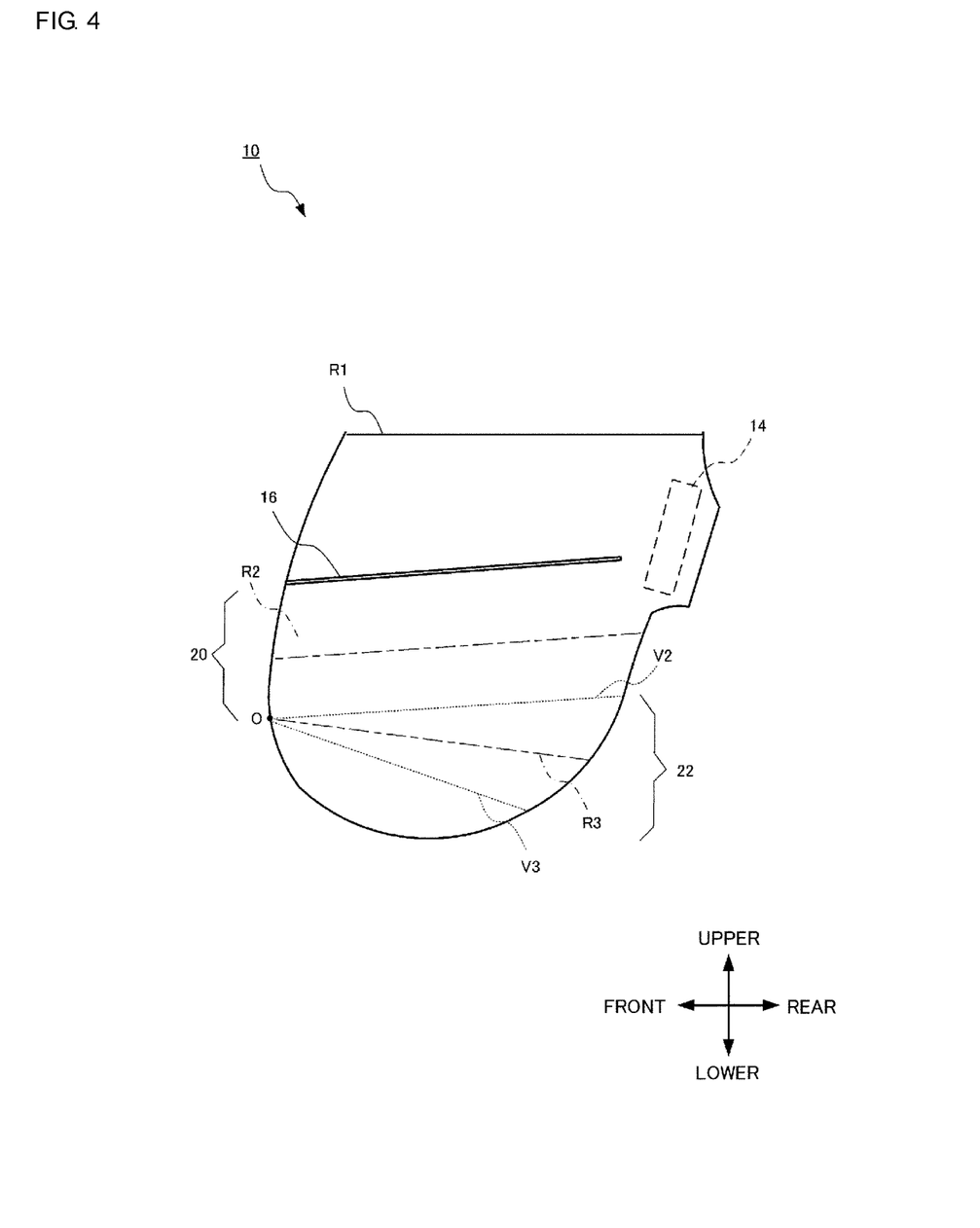
FIG. 4 is a side view showing a part of the folding process of the airbag shown in FIG. 3.

FIG. 4 to FIG. 7 show the folding process of the airbag 12 shown in FIG. 3. When the airbag 12 is folded (compressed), the upper tuck-in region 18 is first tucked into the airbag in a pleated shape as shown in FIG. 4.

Figure 5:
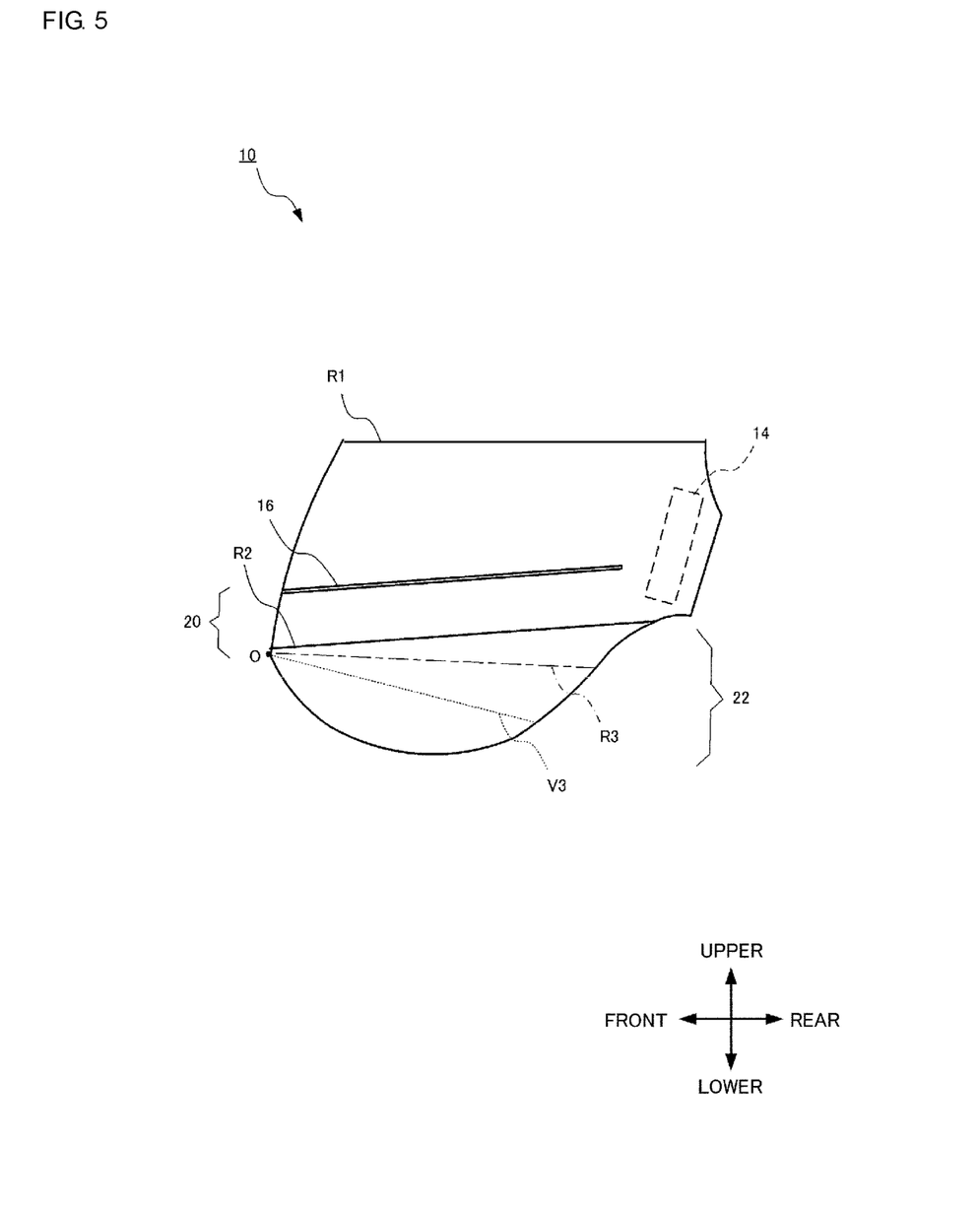
FIG. 5 is a side view showing a part of the folding process of the airbag shown in FIG. 3.
Figure 6:
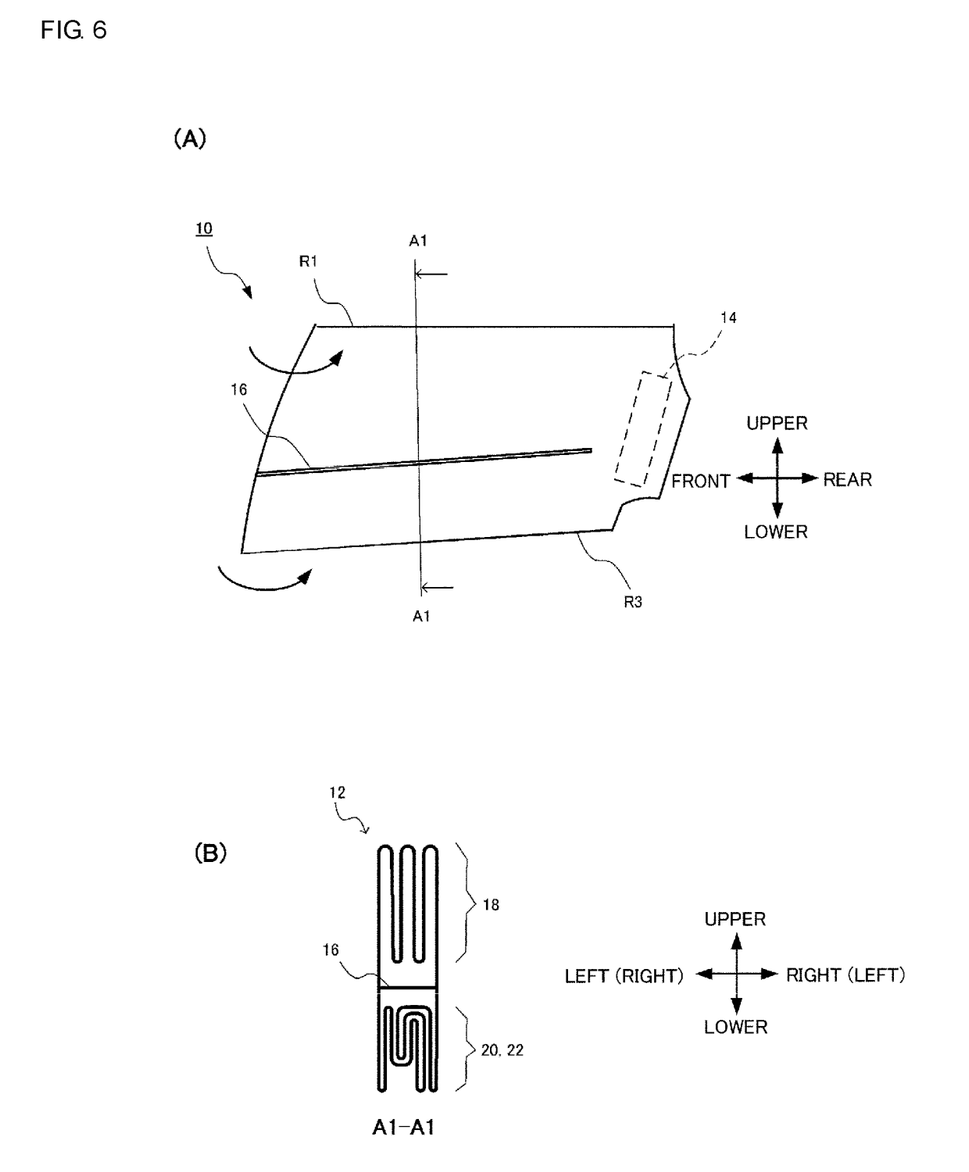
FIG. 6(A) is a side view showing a part of the folding process of the airbag shown in FIG. 3.
FIG. 6(B) is a cross-sectional view in the A1-A1 direction of FIG. 6(A).

Next, as shown in FIG. 5, the parallel folded region 20 of the lower tuck-in regions 20 and 22 is tucked into the airbag in a pleated shape along the mountain fold line R2 and the valley fold line V2. At this time, the valley fold line V2 enters the airbag 12, while the mountain fold line R2 remains. Further, the radial folded region 22 is still brought into a state of protruding outward from the lower tuck-in regions. In the present invention, this state is effective in that the radial folded region 22 deploys prior to the parallel folded region 20.

Then, as shown in FIG. 6(A), the radial folded region 22 is tucked into the airbag in a pleated shape along the mountain fold line R3 and the valley fold line V3. At this time, the radial folded region 22 is completely accommodated inside the parallel folded region 20, and all the tuck-in processes are completed. As a result, the airbag 12 is formed in a plane shape like a nearly rectangular shape extending in the front and rear directions in a range slightly larger than the length (height) of the inflator 14.

Figure 7:
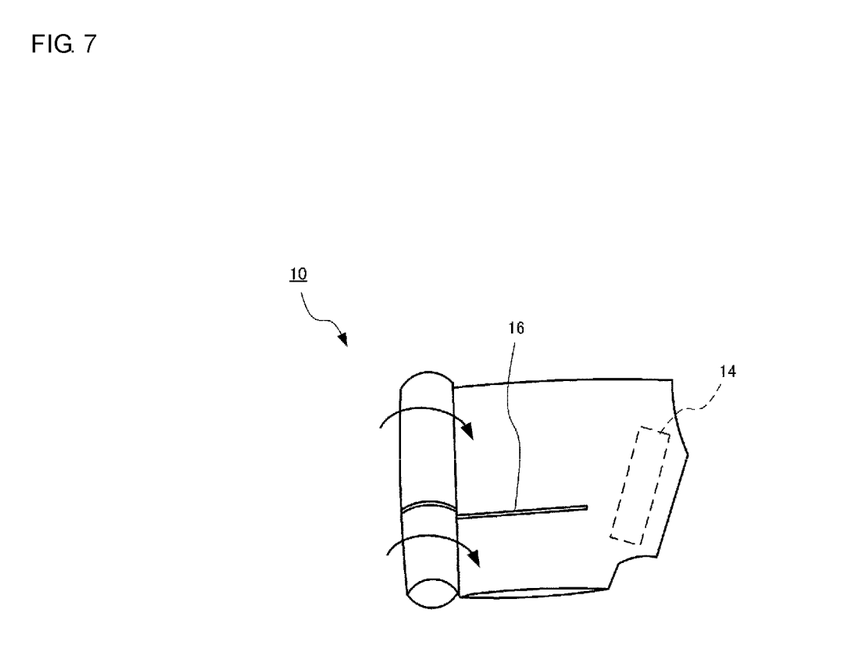
FIG. 7 is a side view showing a part of the folding process of the airbag shown in FIG. 3.

After that, as shown in FIG. 7, the folded airbag 12 is rolled from the front side to the rear side (the side of the inflator 14) to be brought into an accommodated state.

Figure 8:
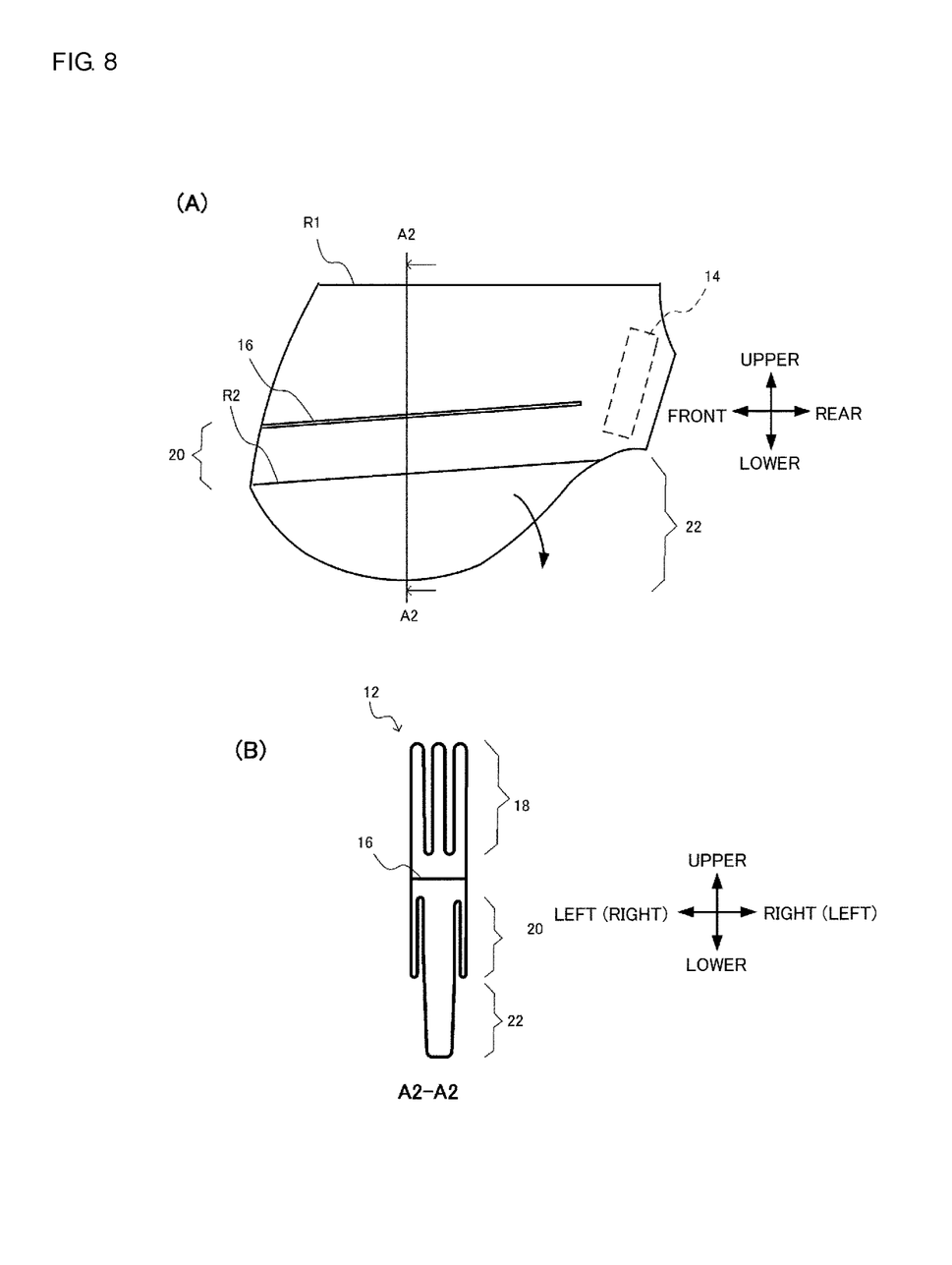
FIG. 8(A) is a side view showing the deploying state of the airbag shown in FIG. 3.
FIG. 8(B) is a cross-sectional view in the A2-A2 direction of FIG. 8(A).

FIG. 8(A) is a side view showing the deploying state of the airbag 12 shown in FIG. 3. FIG. 8(B) is a cross-sectional view in the A2-A2 direction of FIG. 8(A). In the airbag device 10 according to the present example, the inflator 14 operates to discharge the inflation gas into the airbag 12 when a collision occurs in the vehicle. Then, the radial folded region 22 of the lower tuck-in regions first starts deploying after the airbag 12 in a rolled state is released. At this time, a vehicle rear portion having a wide folding width starts deploying at the very beginning to restrain the lumbar portion of the occupant. After that, the upper tuck-in region 18 and the parallel folded region 20 deploy, and the airbag 12 is brought into a fully deploying state.

As described above, according to the present example, a part of the lower tuck-in regions 20 and 22 has the radial folded region 22 folded into a pleated shape along the lines extending rearward in the radial direction from the central point O positioned on the front side of the airbag. Therefore, the rear portion of the radial folded region 22 first deploys at the initial stage of the deployment of the airbag 12. Therefore, it becomes possible to quickly restrain the vicinity of the lateral portion of the lumbar of the occupant sitting on the vehicle seat.

Note that the parallel folded region 20 is provided as one of the lower tuck-in regions in the above example, but it is also possible to omit the parallel folded region 20 and constitute the lower tuck-in regions only with the radial folded region 22.

Figure 9:
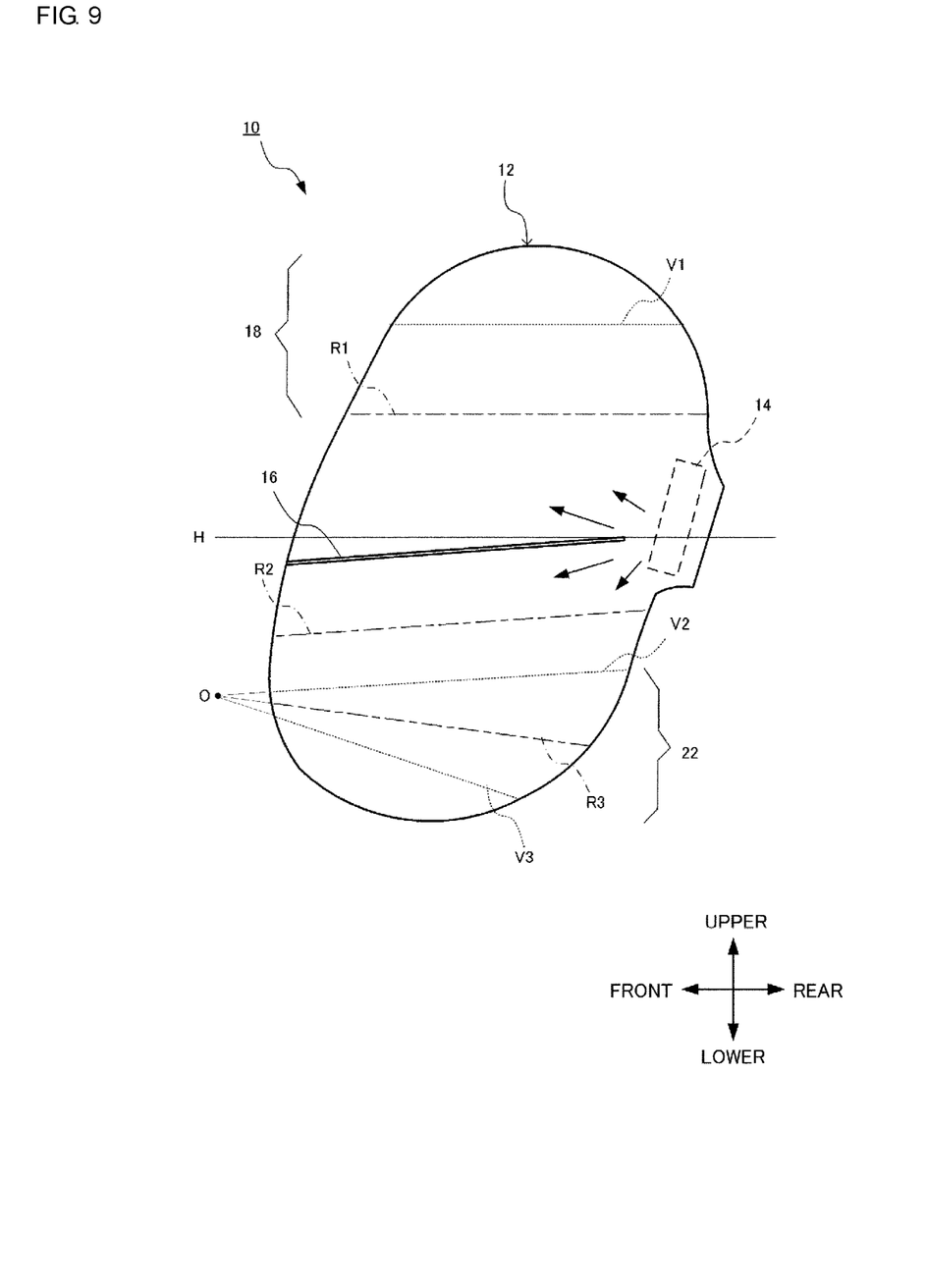
FIG. 9 is a side view (plan view) showing the deploying state (state before compression) of the side airbag device according to another example of the present invention.
Figure 10:
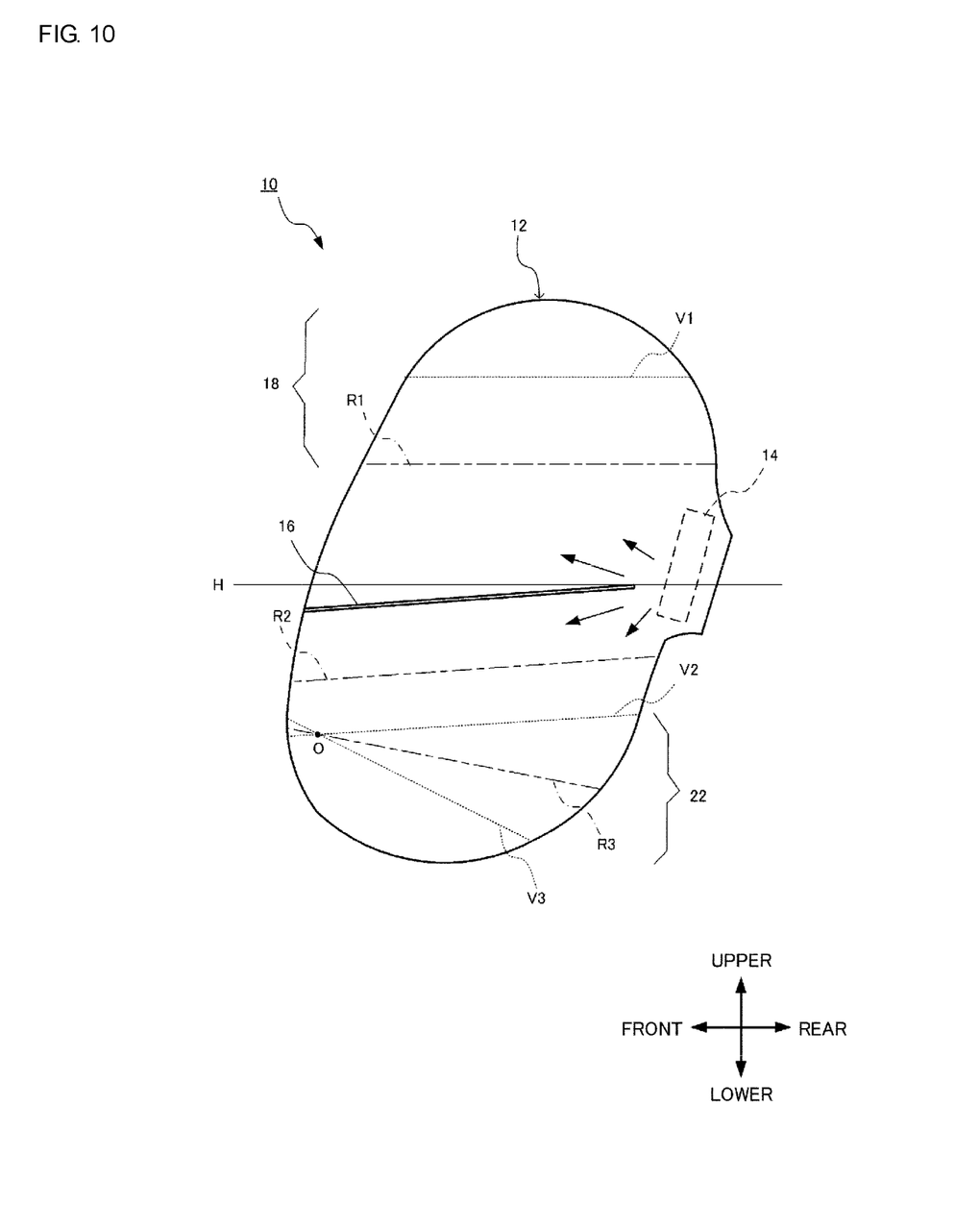
FIG. 10 is a side view (plan view) showing the deploying state (state before compression) of the side airbag device according to still another example of the present invention.

FIG. 9 and FIG. 10 are side views (plan views) showing the deploying state (state before compression) of the side airbag device according to other examples of the present invention.

The central point O of the fold lines of the radial folded region 22 is positioned on the front marginal portion of the airbag 12 in the example shown in FIG. 3 to FIG. 8(B) but it is also possible to shift the position of the central point O as shown in FIG. 9 and FIG. 10.

In a modified example shown in FIG. 9, the central point O is virtually set outside the front marginal portion of the airbag 12. In this case, the front portion of the airbag 12 has a large folding width, which brings about an advantage that the front portion also deploys relatively quickly.

On the other hand, in a modified example shown in FIG. 10, the central point O is set on the inside of the front marginal portion of the airbag 12. In this case, the fold lines (V2, R3, and V3) can have a large inclination angle, which makes it possible to more quickly deploy the rear lower end of the airbag.

The present invention is described in association with the above illustrative embodiment, but much abundant equivalent modifications and deformations will become apparent to persons skilled in the art according to the present disclosure. Accordingly, it is perceived that the above illustrative embodiment of the present invention is illustrative but is not limitative. Various alterations may be added to the described embodiment without departing from the spirit and scope of the present invention.

While the above description constitutes the preferred embodiment of the present invention, it will be appreciated that the invention is susceptible to modification, variation and change without departing from the proper scope and fair meaning of the accompanying claims.

The invention claimed is:

1. A side airbag device adapted to deploy from a lateral portion of a vehicle seat toward a front side of a vehicle, comprising:
   a bag-shaped airbag; and
   an inflator that supplies an inflation gas into the airbag, wherein
   the airbag has, at least a lower portion, thereof, of a lower tuck-in region tucked into the airbag, and
   a first part of the lower tuck-in region is folded into a fan shape and has a radial folded region folded into a pleated shape along a line extending rearward in a radial direction from a central point of the fan shape positioned on a front side of the airbag
   a second part of the lower tuck-in region has a plurality of parallel folded regions folded along at least two substantially parallel lines above the radial folded region, and
   the radial folded region is tucked between the parallel folded regions.

2. The side airbag device according to claim 1, further comprising, the central point of the fan shape is positioned on a marginal portion of the airbag on the front side of the vehicle upon a deployment of the airbag.

3. The side airbag device according to claim 1, further comprising, the central point of the fan shape is provided to be positioned outside a marginal portion of the airbag on the front side of the vehicle upon deployment of the airbag.

4. The side airbag device according to claim 1, further comprising, the central point of the fan shape is provided to be positioned on the inside of a marginal portion of the airbag on the front side of the vehicle upon a deployment of the airbag.

5. The side airbag device according to claim 1, further comprising, at least a part of the radial folded region is brought into a state of protruding from the lower tuck-in region in a state in which the parallel folded regions are tucked into the airbag.

6. The side airbag device according to claim 1, further comprising, the fold lines of the parallel folded regions are inclined such that front sides thereof are lower with respect to a horizon.

7. The side airbag device according to claim 1, further comprising,
   the inflator is accommodated on a rear side of the vehicle inside the airbag, and
   an upper fold line of the parallel folded regions is positioned in a vicinity of a lower end of the inflator.

8. The side airbag device according to claim 1, further comprising,
   a baffle member that vertically distributes the gas discharged from the inflator is arranged inside the airbag, and
   the lower tuck-in region is arranged below the baffle member.

9. The side airbag device according to claim 8, further comprising, the baffle member is inclined such that a front side of the baffle member is lower with respect to a horizon.

10. The side airbag device according to claim 8, further comprising, fold lines of the parallel folded region are formed to be substantially parallel to the baffle member.

11. The side airbag device according to claim 1, further comprising, the airbag further has, at an upper portion thereof, an upper tuck-in region tucked into the airbag.

* * * * *